R. M. FRANKLIN.
TRAP.
APPLICATION FILED JUNE 24, 1909.
997,123.
Patented July 4, 1911.
3 SHEETS—SHEET 3.
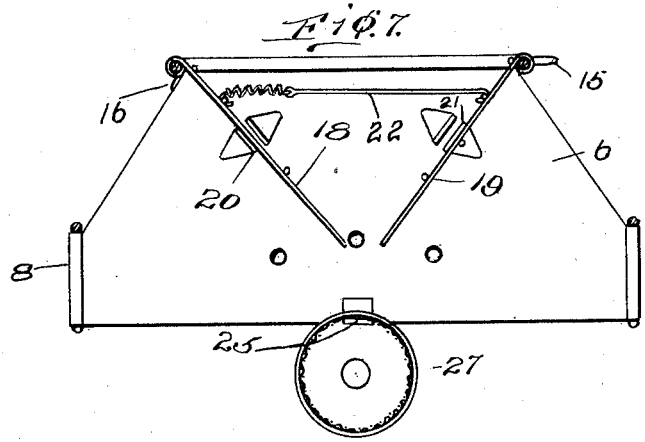
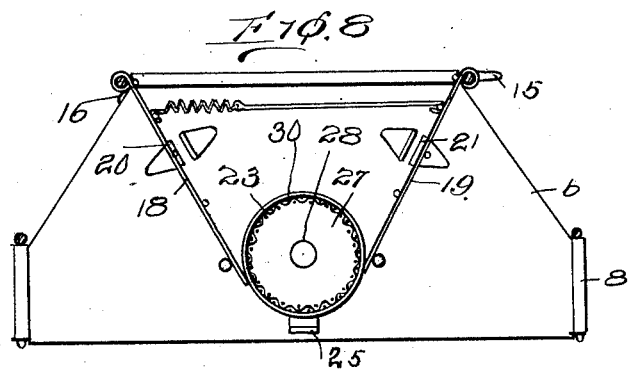
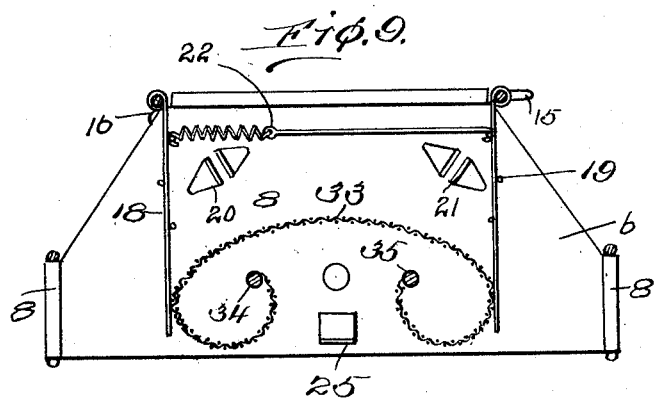
Inventor
Robert M. Franklin
By Mason Fenwick & Lawrence
his Attorneys
Witnesses
J. M. Fowler Jr.
A. S. Kitchin

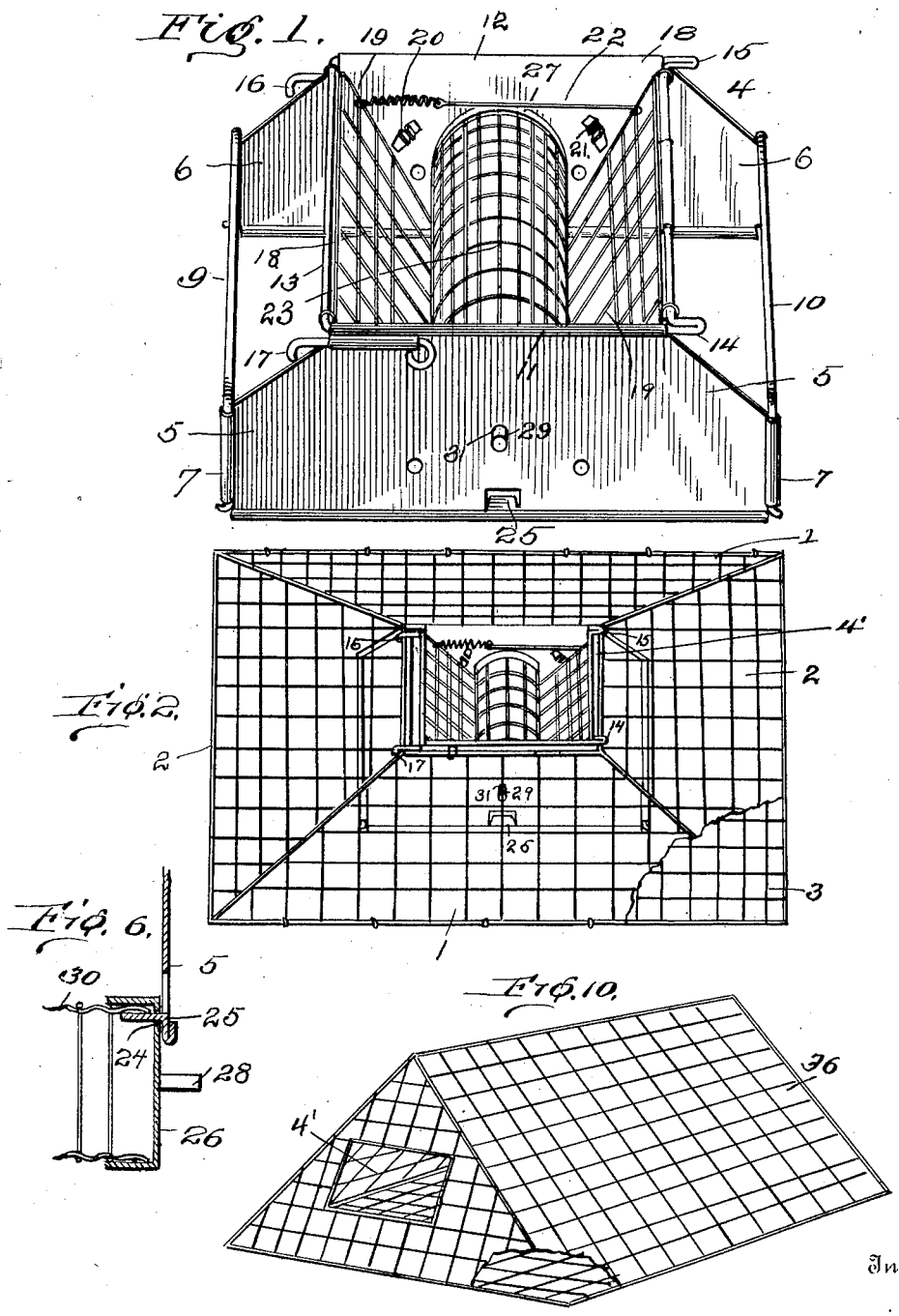

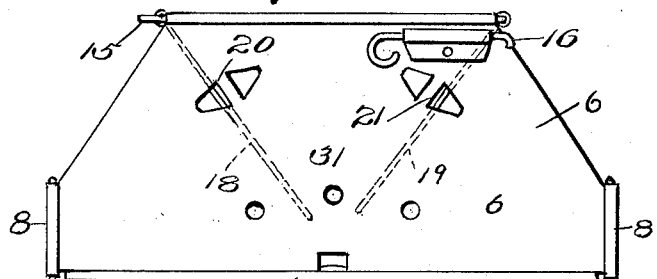
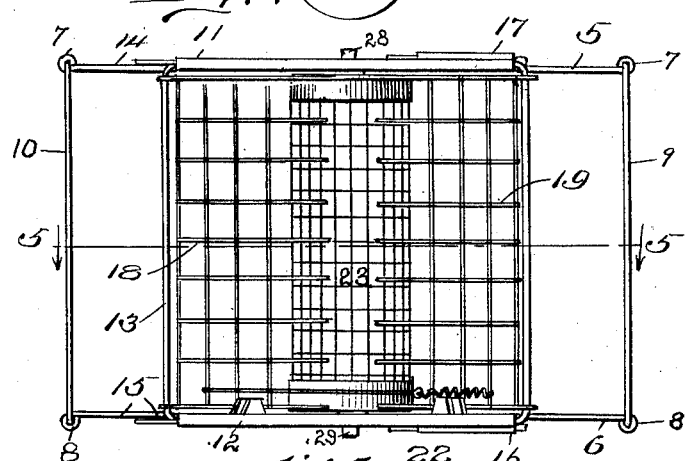
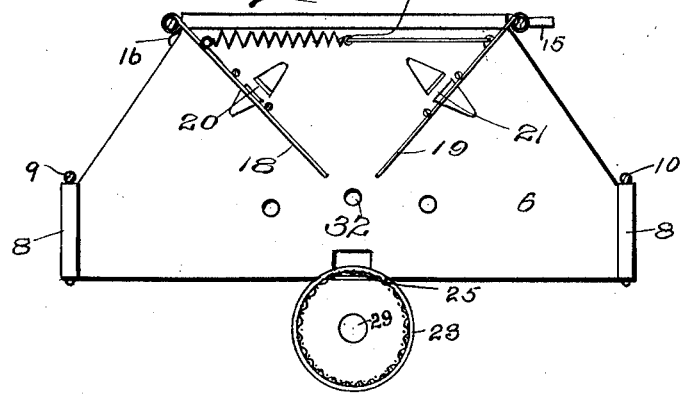

UNITED STATES PATENT OFFICE.

ROBERT M. FRANKLIN, OF GALVESTON, TEXAS.

TRAP.

997,123.      Specification of Letters Patent.      Patented July 4, 1911.

Application filed June 24, 1909. Serial No. 504,139.

*To all whom it may concern:*

Be it known that I, ROBERT M. FRANKLIN, a citizen of the United States, residing at Galveston, in the county of Galveston and State of Texas, have invented certain new and useful Improvements in Traps; and I do hereby declare the following to be a full, clear, and exact description of the invention, such as will enable others skilled in the art to which it appertains to make and use the same.

This invention relates to improvements in traps, and particularly to the inlet or trapping device, and also to the arrangement of detachable bodies therefor.

The object of the invention is to provide a detachable inlet or trapping device constructed either of wood or metal or a combination of both that may be used in combination with a trap or receptacle made likewise of wood or metal and of any desired form.

Another object is to provide an inlet device so constructed and combined as to be readily detachable and easily adjustable for catching either fish, eels, crabs, lobsters or other crustacea.

A further object is to provide a means for saving bait and holding it in position where it will be most likely to attract fish or other marine animals and entice them into the trap.

With these and other objects in view, the invention comprises certain novel constructions, combinations and arrangement of parts as will be hereinafter more fully described and claimed.

In the accompanying drawings; Figure 1 is a perspective view of a complete detachable inlet device on a large scale. Fig. 2: is a perspective view of the trap body with inlet device detached. Fig. 3: is an enlarged side elevation of the inlet device. Fig. 4: is a top plan view of the structure shown in Fig. 3. Fig. 5: is a section through Fig. 4 approximately on line 5—5. Fig. 6: is an enlarged detail fragmentary sectional view through one end of the bait holder and associated parts. Fig. 7: is a section through the structure shown in Fig. 4 but with one of the gates held against movement. Fig. 8: is a section through the structure shown in Fig. 4, but with the bait holder and pivotally mounted gates differently arranged. Fig. 9: is a longitudinal vertical section through a slightly modified form of the invention. Fig. 10: is a perspective view of a trap body adapted to inlet devices at the ends.

In constructing a trap according to the present invention, a housing of any desired kind may be used but preferably one that is either pyramidal or frusto-pyramidal in form, with appropriate rectangular apertures for insertion of the inlet device, either in the top or end of the trap as shown by Figs. 2 and 10.

In order that the invention may be clearly understood, an embodiment of the same is shown in the accompanying drawings in which (1) indicates the sides, and (2) the ends of a pyramidal body, formed with wire netting, though wooden strips or basket work may be used.

The bottom (3) is made separate and attached to the body by wire or twine loops or other convenient means.

The inlet opening 4' is arranged to receive the inlet device 4. When the opening 4' is formed by the sides, as shown in Fig. 2, part of the respective sides form the walls of the opening, but when the opening is arranged in the end of the device, as shown in Fig. 10, a suitable frame is provided for engaging members 14, 15, 16 and 17 of the inlet device. For storing or transportation, the inlet device and body are detached from the bottom so that a number of traps may be nested or telescoped together.

The inlet device (4), as more clearly shown in Figs. 3 to 5 inclusive, is formed with side plates or members 5 and 6, which are similar in shape, and are provided with turned over ends 7—7 and 8—8. Positioned in the ends 8—8 are rods 9 and 10, which project over, and have turned over ends which fit into the turned over portions 7—7 and are adapted to hold the end plates 5 and 6 firmly in place when the inlet device is set up for use, and these rods serve also as stops to control the gates as hereinafter explained. The upper edges of side plates 5 and 6 are turned over at 11 and 12 for accommodating a wire 13, which extends through both turned over portions, 11 and 12 and connects plate 5 to plate 6 at both ends of the turned over portions, 11 and 12. In addition, the rectangular wire frame 13 is also formed with projections 14 and 15 which extend, say one inch over the edge of the aperture provided for the inlet device, and at the end of the plates 5 and 6 opposite the projections 14 and 15, are provided slides 16 and 17, which are adapted to slide over the edge of the inlet device aperture, and which, in conjunction with the edges of the end plates 5 and 6, serve to interlock the inlet device firmly in position, and yet permit ready removal thereof.

Pivotally mounted upon the rectangular wire frame 13 and oppositely positioned, are gates 18 and 19, preferably formed with wire mesh or rods and are held in close proximity to the cylindrical bait holder 23, as shown in Fig. 8, or against the modified form of bait holder and guide, 33, shown in Fig. 9.

The gates are held in a closed position by the spring 22 constructed preferably with a short rubber band or wire coil attached to one of the gates and extended by means of a long wire hook secured to the opposite gate. The cylindrical or revolving bait holder, 23, is formed of a wire mesh cylinder 30 with end members 26 and 27 constructed preferably of solid material formed with trunnions and adapted to cover the ends of the cylinder, after bait has been inserted therein. The trunnions, 28 and 29, are adjusted in the apertures 31 and 32, as shown in Figs. 1 and 8, when a revolving bait holder is desired, but in case the stationary bait holder is used, the same cylindrical bait holder is formed with rectangular slots or apertures 24—24 in each end, through which the lugs 25—25, preferably struck from the end plates 5 and 6, pass for holding the bait holder in position and stationary. This last mentioned adjustment, is more especially adapted for trapping fish, for which purpose the inlet device should be adjusted so that the gates will open horizontally to the right and left. The modified form of bait holder and guide 33 in Fig. 9, is also made of wire mesh turned over rods 34 and 35 which extend just far enough beyond the meshed bait holder to pass through the appropriate apertures in the end plates, and secure the bait holder in place with the gates pressing lightly against its sides as shown in Fig. 9.

In every adjustment of the bait holder and the swinging gates, the rods 9 and 10, serve to lock the bait holder in a desired position, prevent the end plates from impinging on the gates, and to prevent the gates from opening too far or becoming entangled with the body of the trap. On one of the end plates, double lugs are formed by cutting through the plate and turning up short triangular projections 20 and 21, which are positioned so as to stop the gates and prevent too close contact with the cylindrical bait holder, as shown in Fig. 8, or with the inner edges or fingers of the gates as shown in Fig. 3. When the inlet device is positioned in the side or end of the trap with the gates adjusted horizontally for trapping crabs or lobsters, the lower gate is adjusted between the said double lugs thus providing a rigid guide way on which the crabs, lobsters, or eels may enter the trap by pushing under the yielding upper gate shown in Fig. 7.

The inlet device shown in Fig. 1 is placed in the top or some other convenient place in the body of the trap, and is held therein by members 14, 15, 16 and 17. When the bait holder 23 is arranged, as shown in Fig. 1, a crab or lobster entering will rest on the bait holder so as to immediately attack the bait, but in permitting his weight to act upon the bait holder the same will rotate until the lobster or crab as the case may be has reached the underneath side of the bait holder and in the trap. During the rotation of bait holder 23 the crab or lobster will strike against one of the gates, but the movement of the bait holder is necessarily slow and the gates are yieldingly mounted so that the crab or lobster will remain upon the bait holder attempting to secure the bait therein until he has passed entirely within the trap. The next succeeding crab or lobster will follow the same course and if the first crab or lobster is hanging on the lower side of the bait holder he will be scraped off by striking against the pointed end of gates 18 and 19. In this connection it will be observed that the gates 18 and 19 are preferably formed of wire mesh or rods and the rods engage the sides of the bait holder 23 so that none of the fish, lobsters, or the like that enter the trap may escape therefrom or may move the gates to an open position.

When using the form shown in Figs. 3 to 5 inclusive spring 22 is connected with gates 18 and 19 so as to normally hold the same in engagement with projections 20 and 21, but permitting the gates to open when pressure is brought thereon from the outside, for instance when a lobster enters. Immediately upon the passage of the lobster through the gate over the body of the trap the gates will assume their original position, and thus prevent the return of the lobster to the outside of the trap. The lobster or other crustacea is attracted to the inlet device and to rest upon the gates by having bait holder 23 positioned below the meeting edges of the gates.

When using the form disclosed in Fig. 9 the gates are held apart but in condition for permitting a lobster or the like to open the same in order to enter the trap. The bait is mounted below the guide 33 in any desired manner so that a lobster, crab, or the like must pass around either end of the guide 33 and force open either of the gates 18 or 19 before it can reach the bait. This form of the inlet device is preferably used when catching fish and is adapted to be used with the substantially V-shaped trap body 36 shown in Fig. 10. The inlet device in the trap body 36 is positioned in the end thereof and may be arranged so that the gates will be positioned in a vertical plane in order to move pivotally in a horizontal plane.

It will thus be observed that the various members of the device are so arranged and combined as to be easily adjusted for trapping either fish, crabs, lobsters or eels, while the bait is conserved and placed in position best adapted to tempt the animals into the trap from which escape is barred by the closed gates.

What I claim is:

1. In a device of the character described, the combination with a body, of an inlet device therefor formed with a framework having a pair of rigidly projecting securing members extending therefrom, a pair of slidably mounted securing members secured to said frame, a pair of side plates pivotally connected with said frame, bracing members pivotally connected with said side plates for holding the same spaced apart and extending substantially at right angles to said frame, and yielding gates pivotally mounted on said frame for normally closing the inlet device.

2. In a device of the character described, the combination with a body, of an inlet device therefor formed with a frame having projections extending therefrom for securing the inlet to said body, a pair of side plates connected with said frame, a plurality of pivotally mounted bracing members connecting said side plates for holding the same rigidly spaced apart in respect to each other, and a pair of yielding gates pivotally mounted on said frame between said side plates for normally closing said inlet device.

3. In a device of the character described, a body, an inlet device formed of a rectangular frame, pivotally mounted sides, a pair of pivotally mounted connecting bracing arms mounted on said sides, for holding said sides apart, a pair of pivotally mounted gates mounted on said frame, yielding means for closing said gates, and a bait holder supported by said sides in proximity to the ends of said gates.

4. In a device of the character described, a body, an inlet device formed of a rectangular frame, pivotally mounted sides, stay rods pivotally mounted on said sides for spacing said sides, a pair of swinging gates mounted on said frame, a revolving bait holder journaled in said sides and positioned between said gates near their inner ends, and means for yieldingly holding the ends of said gates in proximity to said bait holder.

5. In a device of the character described, a body portion, an inlet device formed of a rectangular frame, swinging gates mounted on said frame, side plates pivoted to said frame, a pair of pivotally mounted connecting and bracing arms mounted on said plates, and a bait holder secured between said sides and positioned between the lower ends of the gates.

6. In a device of the character described, the cage or body portion, an inlet device formed of a rectangular frame, sides pivotally mounted thereon, a pair of swinging gates oppositely mounted in said frame, means for yieldingly drawing the gates together, means for holding the inner ends of said gates spaced apart, means for holding the lower gate rigid, when the inlet device is adjusted, with the gates in a horizontal position and a bait holder secured between the sides of the inlet device and in proximity to the inner ends of said gates.

7. In a device of the character described, a cage or body formed with a rectangular aperture, a rectangular frame, formed with projections at two of its adjacent corners, and sliding bolts at the opposite corners, collapsible inlet sides, constructed and adapted in conjunction with said projections to lock the inlet in said rectangular aperture, a pair of pivotally mounted connecting bracing arms, a pair of pivotally mounted gates, means for securing the ends of said gates spaced apart and means for holding bait in proximity to the ends of said gates.

8. In a device of the character described, a body portion, an inlet device formed with a rigid frame, side members connected with said frame, a plurality of converging gates mounted on said frame and arranged to yield from pressure without and resist pressure from within, rigid securing members connected with one end of said frame, slidably mounted securing members connected with the opposite end said frame for removably securing the inlet device to said body portion, and a bait holder connected with said sides and arranged in proximity to the inner ends of said gates.

In testimony whereof I affix my signature in presence of two witnesses.

ROBERT M. FRANKLIN.

Witnesses:
FRANK JONES,
C. HARPER ANDERSON.

Copies of this patent may be obtained for five cents each, by addressing the "Commissioner of Patents, Washington, D. C."